United States Patent
Han et al.

(10) Patent No.: US 9,967,559 B1
(45) Date of Patent: May 8, 2018

(54) MOTION VECTOR DEPENDENT SPATIAL TRANSFORMATION IN VIDEO CODING

(71) Applicant: GOOGLE LLC, Mountain View, CA (US)

(72) Inventors: Jingning Han, Stanford, CA (US); Debargha Mukherjee, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1117 days.

(21) Appl. No.: 13/764,020

(22) Filed: Feb. 11, 2013

(51) Int. Cl.
*H04N 19/61* (2014.01)
(52) U.S. Cl.
CPC .............................. *H04N 19/00793* (2013.01)
(58) Field of Classification Search
None
See application file for complete search history.

(56) References Cited

U.S. PATENT DOCUMENTS

| | | |
|---|---|---|
| 4,774,574 A | 9/1988 | Daly et al. |
| 5,068,724 A | 11/1991 | Krause et al. |
| 5,091,782 A | 2/1992 | Krause et al. |
| 5,121,216 A | 6/1992 | Chen et al. |
| 5,146,324 A | 9/1992 | Miller et al. |
| 5,224,062 A | 6/1993 | McMillan, Jr. et al. |
| 5,235,623 A | 8/1993 | Sugiyama et al. |
| 5,260,782 A | 11/1993 | Hui |
| 5,274,442 A | 12/1993 | Murakami et al. |
| 5,341,440 A | 8/1994 | Earl et al. |
| 5,422,963 A | 6/1995 | Chen et al. |
| 5,444,800 A | 8/1995 | Kim |
| 5,635,938 A | 6/1997 | Komoto |

(Continued)

FOREIGN PATENT DOCUMENTS

| | | |
|---|---|---|
| JP | 2010199959 | 9/2010 |
| WO | WO2010039015 | 4/2010 |

(Continued)

OTHER PUBLICATIONS

WO2012005099A1.*

(Continued)

*Primary Examiner* — Mohammad J Rahman
(74) *Attorney, Agent, or Firm* — Young Basile Hanlon & MacFarlane, P.C.

(57) ABSTRACT

Coding efficiency may be improved by subdividing a block into smaller sub-blocks for prediction. A first rate distortion value of a block optionally partitioned into smaller prediction sub-blocks of a first size is calculated using respective inter prediction modes and transforms of the first size. The residuals are used to encode the block using a transform of a second size smaller than the first size, generating a second rate distortion value. The values are compared to determine whether coding efficiency gains may result from inter predicting the smaller, second size sub-blocks. If so, the block is encoded by generating prediction residuals for the second size sub-blocks, and neighboring sub-blocks are grouped, where possible, based on common motion information. Each resulting composite residual block is transformed by a transform of the same size to generate another rate distortion value. The encoded block with the value is selected for the bitstream.

16 Claims, 8 Drawing Sheets

(56) References Cited

U.S. PATENT DOCUMENTS

| | | | |
|---|---|---|---|
| 5,737,020 A | 4/1998 | Hall et al. | |
| 5,872,866 A | 2/1999 | Strongin et al. | |
| 5,903,669 A | 5/1999 | Hirabayashi | |
| 6,108,383 A | 8/2000 | Miller et al. | |
| 6,115,501 A | 9/2000 | Chun et al. | |
| 6,134,350 A | 10/2000 | Beck | |
| 6,167,161 A | 12/2000 | Oami | |
| 6,408,025 B1 | 6/2002 | Kaup | |
| 6,522,783 B1 | 2/2003 | Zeng et al. | |
| 6,522,784 B1 | 2/2003 | Zlotnick | |
| 6,683,991 B1* | 1/2004 | Andrew et al. | 382/240 |
| 6,819,793 B1 | 11/2004 | Reshetov et al. | |
| 6,917,651 B1 | 7/2005 | Yoo et al. | |
| 6,934,419 B2 | 8/2005 | Zlotnick | |
| 7,266,149 B2 | 9/2007 | Holcomb et al. | |
| 7,292,634 B2 | 11/2007 | Yamamoto et al. | |
| 7,492,823 B2 | 2/2009 | Lee et al. | |
| 7,894,530 B2 | 2/2011 | Gordon et al. | |
| 7,912,318 B2 | 3/2011 | Nakayama | |
| 7,936,820 B2 | 5/2011 | Watanabe et al. | |
| 8,000,546 B2 | 8/2011 | Yang et al. | |
| 8,094,950 B2 | 1/2012 | Sasagawa | |
| 8,582,656 B2 | 11/2013 | Lin et al. | |
| 8,687,699 B1* | 4/2014 | Wen | 375/240.2 |
| 2002/0168114 A1 | 11/2002 | Valente | |
| 2002/0196983 A1 | 12/2002 | Kobayashi | |
| 2003/0048943 A1 | 3/2003 | Ishikawa | |
| 2003/0146925 A1 | 8/2003 | Zhao et al. | |
| 2004/0057519 A1 | 3/2004 | Yamamoto et al. | |
| 2004/0125204 A1 | 7/2004 | Yamada et al. | |
| 2004/0179820 A1 | 9/2004 | Kashiwagi et al. | |
| 2005/0147163 A1 | 7/2005 | Li et al. | |
| 2005/0249291 A1 | 11/2005 | Gordon et al. | |
| 2006/0045368 A1 | 3/2006 | Mehrotra | |
| 2006/0098738 A1 | 5/2006 | Cosman et al. | |
| 2006/0115168 A1 | 6/2006 | Kobayashi | |
| 2006/0133682 A1 | 6/2006 | Tu et al. | |
| 2006/0210181 A1 | 9/2006 | Wu et al. | |
| 2006/0239575 A1 | 10/2006 | Abe et al. | |
| 2006/0251330 A1 | 11/2006 | Toth et al. | |
| 2007/0036223 A1 | 2/2007 | Srinivasan | |
| 2007/0078661 A1 | 4/2007 | Sriram et al. | |
| 2007/0140349 A1 | 6/2007 | Burazerovic | |
| 2007/0183500 A1* | 8/2007 | Nagaraj et al. | 375/240.16 |
| 2007/0211953 A1 | 9/2007 | Sasagawa | |
| 2007/0223583 A1 | 9/2007 | Nagai et al. | |
| 2008/0008246 A1 | 1/2008 | Mukherjee et al. | |
| 2008/0043848 A1 | 2/2008 | Kuhn | |
| 2008/0123977 A1 | 5/2008 | Moriya et al. | |
| 2008/0253463 A1 | 10/2008 | Lin et al. | |
| 2008/0310512 A1 | 12/2008 | Ye et al. | |
| 2009/0041128 A1 | 2/2009 | Howard | |
| 2009/0049641 A1 | 2/2009 | Pullins et al. | |
| 2009/0067503 A1 | 3/2009 | Jeong et al. | |
| 2009/0123066 A1 | 5/2009 | Moriya et al. | |
| 2009/0228290 A1 | 9/2009 | Chen et al. | |
| 2009/0274382 A1 | 11/2009 | Lin et al. | |
| 2010/0020867 A1 | 1/2010 | Wiegand et al. | |
| 2010/0086049 A1* | 4/2010 | Ye et al. | 375/240.16 |
| 2010/0246951 A1 | 9/2010 | Chen et al. | |
| 2010/0290520 A1 | 11/2010 | Kamisli et al. | |
| 2010/0309286 A1 | 12/2010 | Chen et al. | |
| 2011/0032983 A1* | 2/2011 | Sezer | 375/240.02 |
| 2011/0090959 A1 | 4/2011 | Wiegand et al. | |
| 2011/0182352 A1 | 7/2011 | Pace | |
| 2011/0206135 A1 | 8/2011 | Drugeon et al. | |
| 2011/0274162 A1 | 11/2011 | Zhou | |
| 2011/0286516 A1 | 11/2011 | Lim et al. | |
| 2011/0293009 A1 | 12/2011 | Steinberg et al. | |
| 2011/0293012 A1* | 12/2011 | Au et al. | 375/240.16 |
| 2012/0057360 A1 | 3/2012 | Swan | |
| 2012/0057630 A1 | 3/2012 | Saxena et al. | |
| 2012/0128066 A1 | 5/2012 | Shibahara et al. | |
| 2012/0162455 A1 | 6/2012 | Kim | |
| 2012/0177116 A1* | 7/2012 | Panusopone et al. | 375/240.12 |
| 2012/0201298 A1 | 8/2012 | Panusopone et al. | |
| 2012/0230418 A1 | 9/2012 | Sole Rojals et al. | |
| 2012/0308128 A1* | 12/2012 | Oosake | 382/166 |
| 2013/0003828 A1 | 1/2013 | Cohen et al. | |
| 2013/0034152 A1 | 2/2013 | Song | |
| 2013/0156328 A1* | 6/2013 | Wang et al. | 382/203 |
| 2013/0176211 A1* | 7/2013 | Inada et al. | 345/156 |
| 2013/0272422 A1 | 10/2013 | Lee et al. | |
| 2014/0086314 A1* | 3/2014 | Hebel et al. | 375/240.04 |
| 2014/0092956 A1 | 4/2014 | Panusopone et al. | |

FOREIGN PATENT DOCUMENTS

| | | |
|---|---|---|
| WO | WO2010039288 | 4/2010 |
| WO | WO2011049399 | 4/2011 |

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May, 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Han et al., "Jointly Optimized Spatial Prediction and Block Transform for Video and Image Coding," IEEE Transactions on Image Processing, vol. 21, No. 4 (Apr. 2012).

(56) References Cited

OTHER PUBLICATIONS

Han et al., "Toward Jointly Optimal Spatial Prediction and Adaptive Transform in Video/Image Coding," ICASSP 2010 (Dallas, TX, Mar. 14-19, 2010).

B. Bross, H. Kirchoffer, H. Schwarz, T. Wiegand,"Fast intra encoding for fixed maximum depth of transform quadtree," JCTVC-C311_r1, Guangzhou, CN, Oct. 2010.

B. Bross, W.-J Han, J.-R. Ohm, G. J. Sullivan, T. Wiegand: "High efficiency video coding (HEVC) text specification draft 7", Document of Joint Collaborative Team on Video Coding, JCTVC-I1003-d4, Apr. 27,-May 7, 2012.

Chen J et al. "Description of scalable video coding technology proposal by Qualcomm (configuration)", 11. JCT-VC Meeting; 102. MPEG Meeting; Oct. 10, 2012 Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012, all pages.

Chen J. et al., "TE:Simulation results for various max. number of transform quadtree depth," MPEG Meeting, Guangzhou, Chima; No. M18236; Oct. 28, 2010.

Chen P. et al., "Video coding using extended block sizes," VCEG Meeting, San Diego, US; No. VCEG-AJ23, Oct. 15, 2008.

Guo L et al.: "Transform Selection for Inter-Layer Texture Prediction in Scalable Video Coding", 11. JCT-VC Meeting; 102; MPEG Meeting; Oct. 10, 2012-Oct. 19, 2012; Shanghai; (Joint Collaborative Team on Video Coding of ISO/IEC JTC1/WG11 and ITU-T SG.16); URL:http://wftp3.itu.int/av-arch/jctvc-site/,, No. JCTVC-K0321, Oct. 7, 2012, all pages.

Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.

Lee B. et al., "Hierarchical variable block transform," JCT-VC Meeting, Geneva, Switzerland; No. JCTVC-B050; Jul. 24, 2010.

Lee T et al.: "TE12.1: Experimental results of transform unit quadtree/2-level test", 3 JCT-VC Meeting; 94. MPEG Meeting; Oct. 7, 2010-Oct. 15, 2010; Guangzhou; (Joint Collaborative Team on Video Coding of ISO/ IEC JTC1/SC29/WG11 and ITU-T SG.16); URL:http://wftp3.itu.int/av-arch/jctvc-site/,, No. JCTVC-C200, Oct. 2, 2010, all pages.

McCann K. et al.; "Video coding technology proposal by samsung (and BBC)," JCT-VC Meeting; Dresden, Germany, Apr. 15, 2010.

Krit Panusopone et al., "Flexible Picture Partitioning", JCT-VC (Joint Collaborative Team on Video Coding) JCTVC-C260, Meeting, Oct. 7-Oct. 15, 2010.

Saxena A et al.: "On secondary transforms for intra/inter prediction residual", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL:http://wftp3.itu.int/av-arch/jctvc-site/,, No. JCTVC-10232, Apr. 17, 2012, all pages.

Wiegand, T; B. Bross, J. Ohm, G. Sullivan, "WD1: Working Draft 1 of High-Efficiency Video Coding," JCTVC-C403, Guangzhou, CN, Oct. 7-15, 2010.

Wiegand et al. "BoG report: residual quadtree structure" JCTVC-C319_r1, Guangzhou, CN Oct. 2010.

Sikora, T. et al., Shape-adaptive DCT for generic coding of video, Circuits and Systems for Video Technology, IEEE Transactions on vol. 5, Issue 1, p. 59-62, Feb. 1, 1995.

* cited by examiner

US 9,967,559 B1

MOTION VECTOR DEPENDENT SPATIAL TRANSFORMATION IN VIDEO CODING

TECHNICAL FIELD

This disclosure relates to encoding and decoding visual data, such as video stream data, for transmission or storage.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques.

SUMMARY

Disclosed herein are aspects of systems, methods and apparatuses for coding a video stream having a plurality of frames. One method described herein includes encoding a block a first time to generate a first rate distortion value by encoding at least one sub-block of the block having a first size using a respective inter prediction mode and a transform having the first size, and encoding the block a second time to generate a second rate distortion value by encoding the at least one sub-block of the block having the first size using the respective inter prediction mode and a transform having a second size smaller than the first size. The method also includes, if the second rate-distortion value is less than the first rate distortion value, performing inter prediction of the block by performing inter prediction of a plurality of sub-blocks of the block having the second size to generate a respective plurality of sub-block residuals, combining one or more of the plurality of sub-block residuals to form at least one composite block using motion information associated with respective ones of the plurality of sub-blocks, and encoding the block a third time to generate a third rate distortion value by transforming sub-block residuals of each composite block of the at least one composite block using a respective transform corresponding to a size of each composite block. Finally, the method includes selecting an output encoded block as an encoded block having a lowest rate distortion value.

An apparatus for encoding a video stream having a plurality of frames, according to the teachings herein, includes a memory and a processor. In an implementation, the processor is configured to execute instructions stored in the memory to encode a block a first time to generate a first rate distortion value by encoding at least one sub-block of the block having a first size using a respective inter prediction mode and a transform having the first size, encode the block a second time to generate a second rate distortion value by encoding the at least one sub-block of the block having the first size using the respective inter prediction mode and a transform having a second size smaller than the first size, then, if the second rate-distortion value is less than the first rate distortion value, perform inter prediction of the block by performing inter prediction of a plurality of sub-blocks of the block having the second size to generate a respective plurality of sub-block residuals, combine one or more of the plurality of sub-block residuals to form at least one composite block using motion information associated with respective ones of the plurality of sub-blocks, and encode the block a third time to generate a third rate distortion value by transforming sub-block residuals of each composite block of the at least one composite block using a respective transform corresponding to a size of each composite block. The processor is also configured to select an output encoded block as an encoded block having a lowest rate distortion value.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Real-time video streaming, multi-point video conferencing or video broadcasting are examples of applications that employ video stream encoding including compression. One compression technique includes performing inter prediction on the video stream, wherein blocks of a frame of a video stream are predicted using blocks of data from other frames (e.g., temporally nearby frames) or from other portions of the frame. To encode the block, the encoder tests various partitions of the block (such as splitting a block comprising 16×16 pixels into 8×8 pixel partitions, 4×4 pixel partitions or a combination thereof), performs a motion search per partition, and then forms a prediction block for each partition. The differences between pixel values of the respective prediction blocks (the "residuals") are then coded, representing a reduction in data over the original block. The partitions are sometimes referred to as sub-blocks. After generation of the residuals, transform-based encoders may apply a transform having a first size to certain of the residuals, such as applying a 4×4 transform when the partition dimension is 8×4, 4×8 or 4×4, while applying a transform having a second size to others of the residuals, such as applying an 8×8 transform when the partition dimension is 16×8, 8×8 or 8×16. Unless otherwise noted, when used herein, size refers to a set of dimensions.

In such an arrangement, the grid used for the transforms is fixed. In contrast, according to the teachings herein, the dimension of the transform used for motion compensated prediction residuals is selected depending on the motion information, including partition, motion vector and reference frame(s). In this way, a low complexity approach to searching for the coding mode decisions that minimize rate distortion cost is developed.

First discussed below are environments in which aspects of this disclosure can be implemented, and then details of certain implementations are explained.

Figure 1:
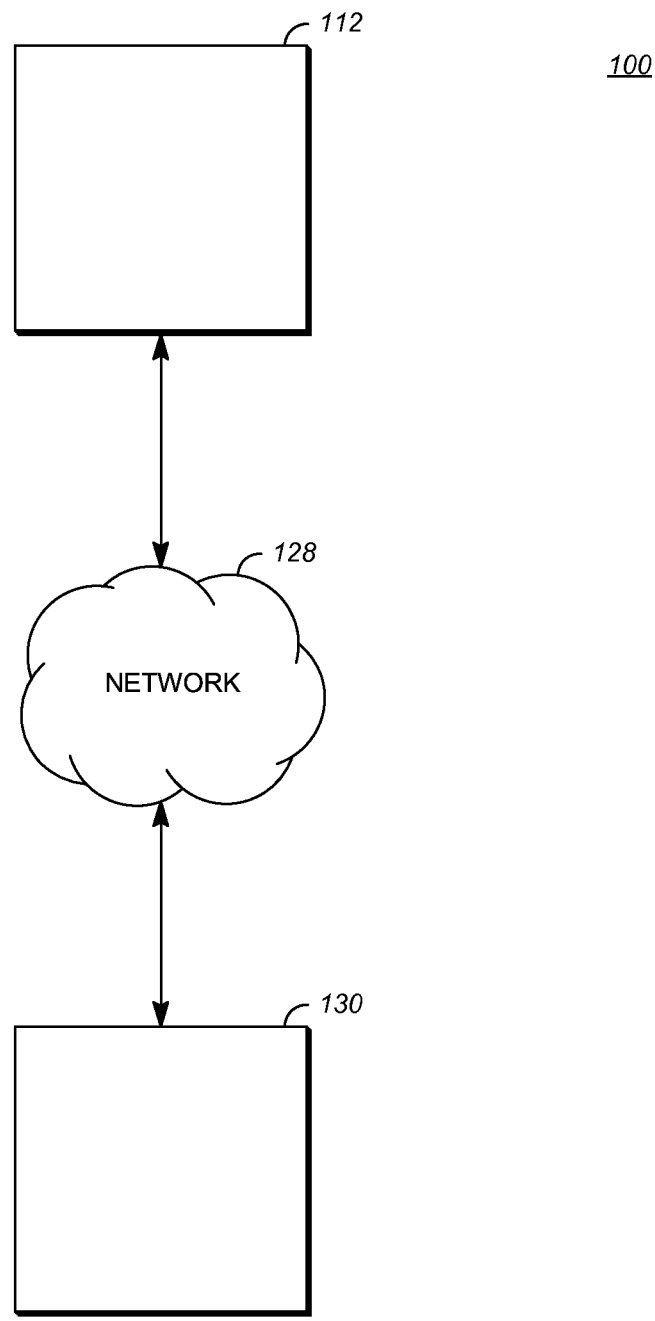
FIG. 1 is a schematic diagram of a video encoding and decoding system.

FIG. 1 is a schematic diagram of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
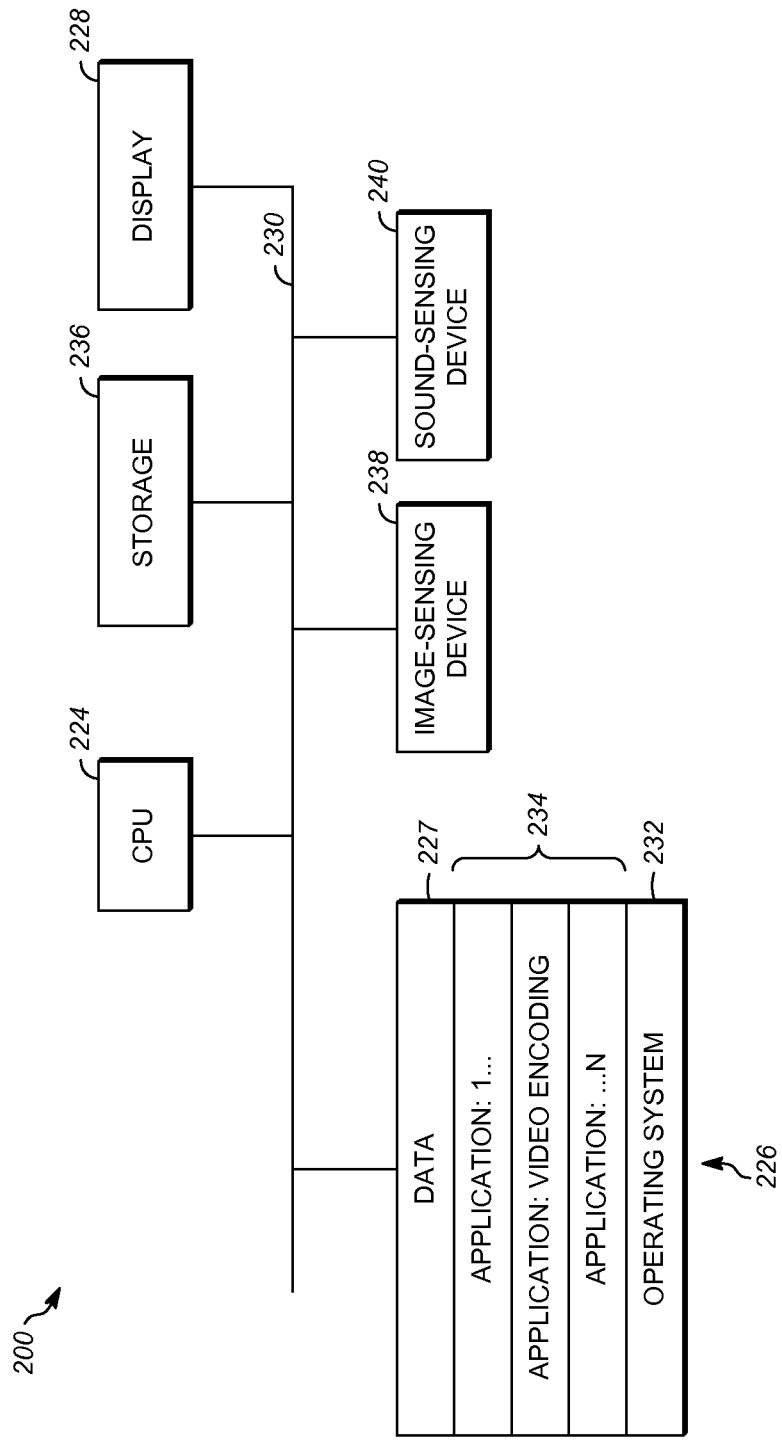
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
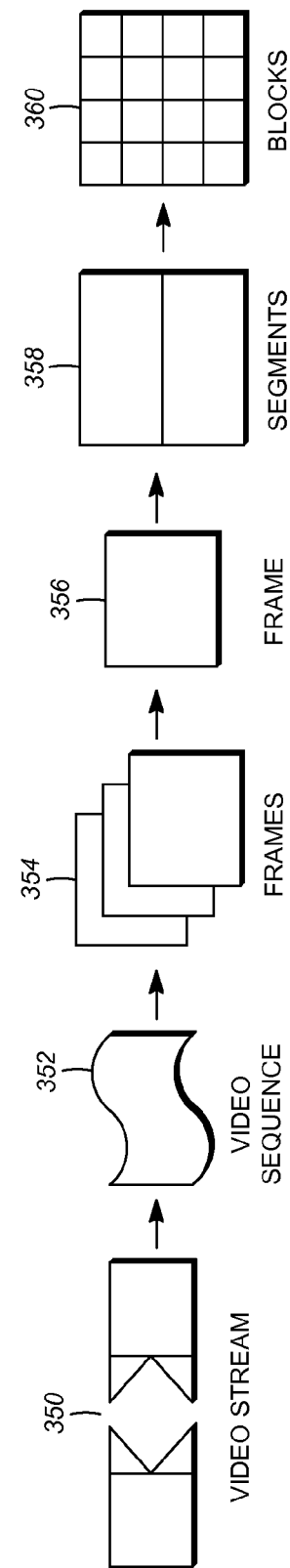
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. At the next level, a single frame 356 can be divided into a series of segments and/or planes 358. Segments 358 can be subsets of frames that permit parallel processing, for example.

Segments 358 include blocks 360, which can contain data corresponding to, for example, 16×16 pixels in frame 356. Blocks 360 can also be of any other suitable size such as 4×4, 8×8 16×8, 8×16, 16×16 or larger. Unless otherwise noted, the terms block and macroblock are used interchangeably herein.

Figure 4:
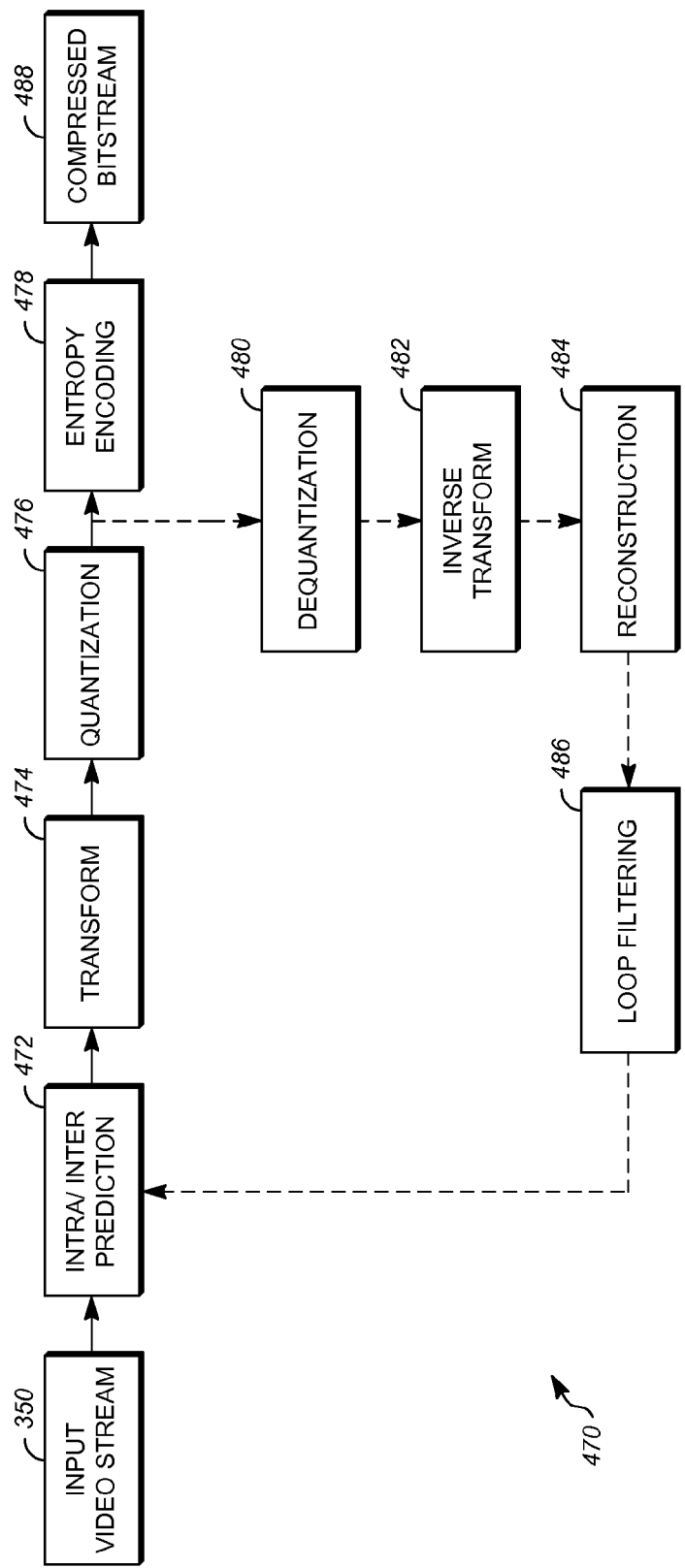
FIG. 4 is a block diagram of a video compression system in accordance with an implementation.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 3, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 within video stream 350 can be processed in units of blocks. At intra/inter prediction stage 472, each block can be encoded using intra-frame prediction (also called intra prediction) or inter-frame prediction (also called inter prediction). In either case, a prediction block can be formed for a block to be encoded. In the case of intra prediction, a prediction block may be formed from nearby data in the current frame that has been previously encoded and reconstructed. In the case of inter prediction, a prediction block may be formed from data in one or more previously constructed reference frames identified through a motion search and associated with a motion vector.

Next, still referring to FIG. 4, the prediction block can be subtracted from the current block at intra/inter prediction stage 472 to produce a residual block (also called a residual). Note that the block may be subdivided into smaller blocks for prediction and the calculation of respective residuals. Transform stage 474 transforms a residual into transform coefficients in, for example, the frequency domain. Examples of block-based transforms include the Karhunen-Loéve Transform (KLT), the Discrete Cosine Transform (DCT), Asymmetrical Discrete Sine Transform (ADST) and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
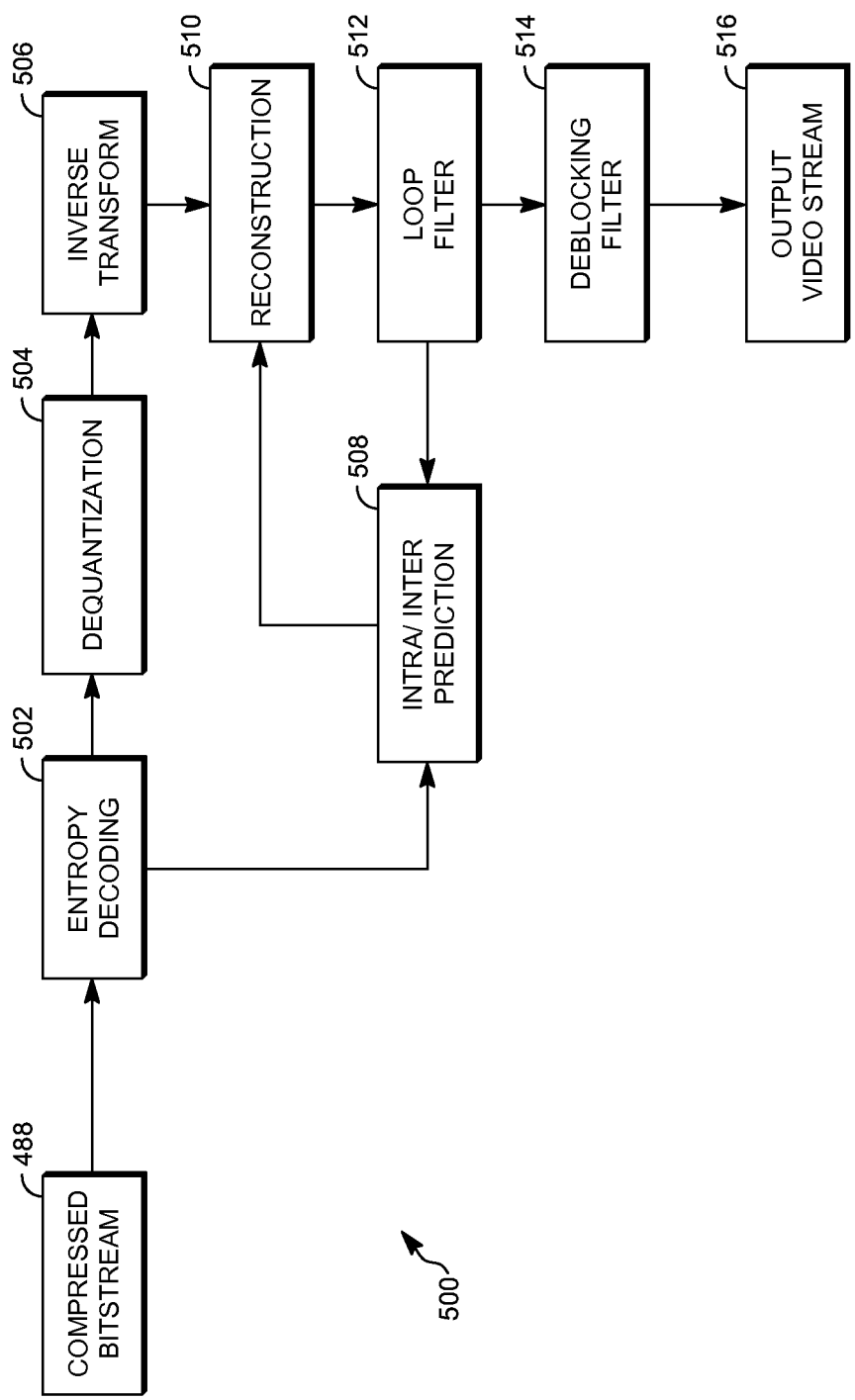
FIG. 5 is a block diagram of a video decompression system in accordance with another implementation.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. For example, deblocking filtering stage 514 can be applied to the reconstructed block to reduce blocking distortion, and the result is output as output video stream 516. Output video stream 516 can also be referred to as a decoded video stream and the terms will be used interchangeably herein.

Other variations of decoder 500 can be used to decode compressed bitstream 488. For example, decoder 500 can produce output video stream 516 without deblocking filtering stage 514.

As mentioned briefly above, the dimension of the transform used for motion compensated prediction residuals may be selected depending on motion information, including partition, motion vector and reference frame(s) using a low complexity approach to searching for coding mode decisions. Details of certain implementations of a motion vector dependent spatial transformation are described below starting with FIG. 6.

Figure 6:
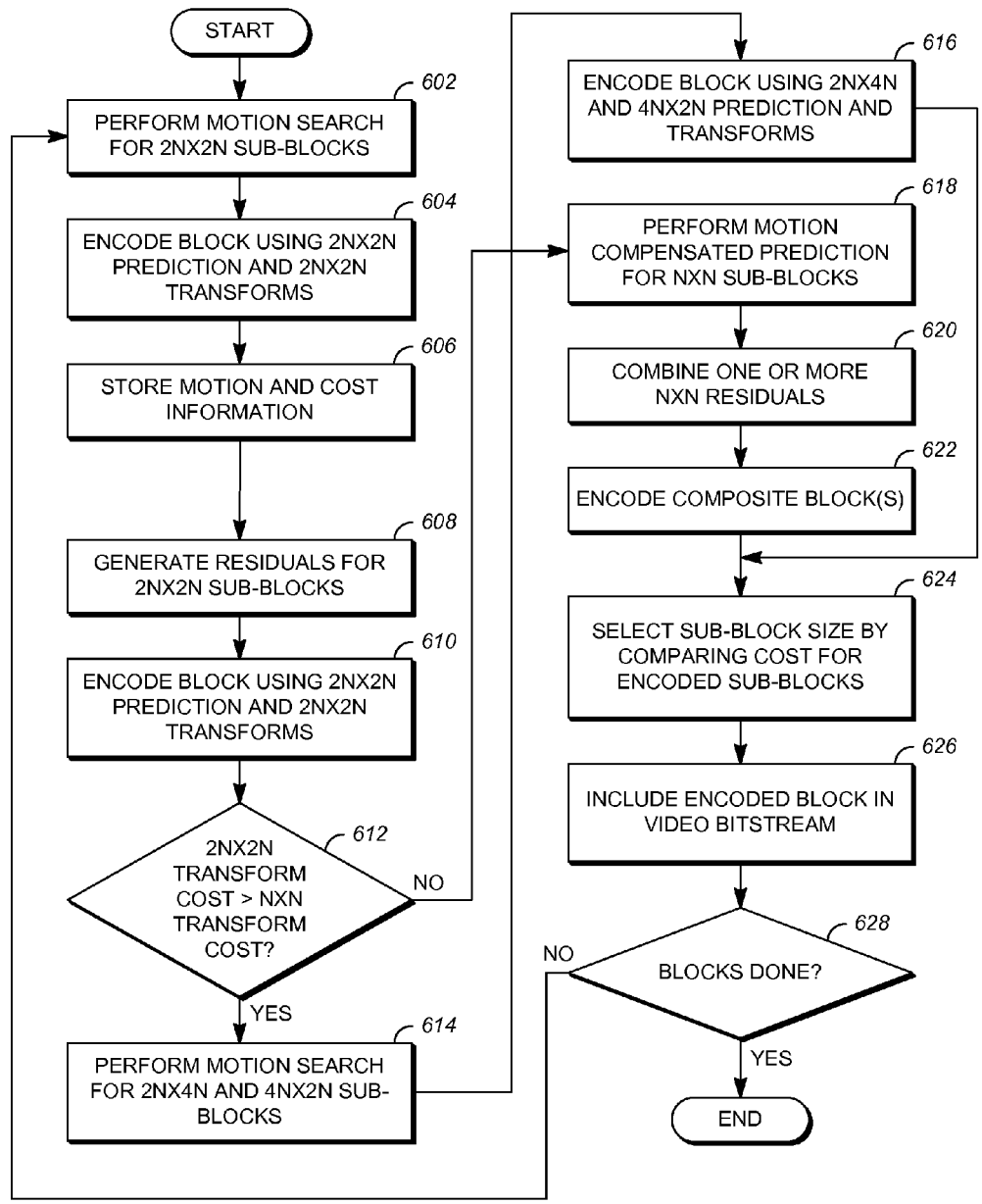
FIG. 6 is a flowchart diagram of a process for encoding a video stream according to an aspect of the teachings herein.

FIG. 6 is a flowchart of a process 600 for encoding a video stream according to an aspect of the teachings herein. Process 600 can be implemented in a system such as system 470 to encode a video stream using inter prediction and variably-sized transforms. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, a motion search is performed to find motion vectors for motion compensated (i.e., inter) prediction for partitions or sub-blocks of a 4N×4N block, where the partitions are of size 2N×2N. In this example, a block may be of a size 16×16, so the sub-blocks comprise 8×8 pixels. Inter prediction is a technique for reducing the number of bits required to represent a block by subtracting video information from one or more reference frames from the current block. Inter prediction can spatially translate the video data from a reference frame to more closely match the current block to compensate for motion of data between frames of video data. Motion vectors indicate how the reference data is to be translated for comparison with the current block or sub-block.

Various motion vectors are tested by encoding the block in step 604. Specifically, each motion vector is used to generate a prediction block by translating pixels from the reference frame using the motion vector. Then, a respective residual block is generated by subtracting a prediction block from a sub-block. A transform having a dimension of 2N×2N is applied to each resultant 2N×2N residual block. Finally, the transformed blocks are quantized and entropy coded. Thus, the block is encoded by encoding its sub-blocks. The motion information that minimizes the rate distortion cost is stored, along with the minimum rate distortion cost in step 606.

As can be recognized from this description, steps 602 and 604 correspond to a rate distortion loop. The rate, or number of bits, required to encode the block including additional bits added to the encoded video bitstream to indicate prediction modes, transform sizes and/or sub-block sizes is measured along with the distortion for each combination of prediction mode, transform sizes and/or sub-block sizes. Distortion can be measured by encoding and decoding a block, then subtracting the decoded block from the original un-encoded block. The difference is a measure of the distortion introduced by the encoding. In this implementation, the rate distortion loop identifies as motion information the combination of motion vectors for the 2N×2N blocks that results in the lowest distortion for a given bit rate, for example, based on testing more than one 8×8 inter prediction mode.

At step 608, the motion information stored in step 606 is used to generate residuals for the 2N×2N sub-blocks. In step 610, process 600 then encodes the block using the residuals. Specifically, an N×N transform is applied to the residuals, followed by quantization and entropy coding. An N×N transform is applied to the 2N×2N residuals where N=4, for example, such that four 4×4 transforms are applied to each of four 4×4 portions of each 8×8 residual. The rate distortion cost of this encoding is calculated in a similar manner as described above.

At step 612, the rate distortion cost for encoding the 2N×2N sub-blocks using 2N×2N transforms is compared with the rate distortion cost for encoding the 2N×2N sub-blocks using N×N transforms. Using N×N prediction modes and N×N transforms to encode a block can improve the rate distortion cost over using 2N×2N prediction modes and 2N×2N transforms. However, testing N×N prediction modes and transforms is very time consuming. Accordingly, an implementation uses the comparison of 2N×2N prediction and 2N×2N transforms to 2N×2N prediction and N×N as a rough proxy to determine whether or not to search N×N partitions of the current block. If performing N×N transforms on 2N×2N predicted data does not yield any improvements in rate distortion, then no N×N encoding modes are tested.

More specifically, if the rate distortion cost resulting from using the 2N×2N transforms is less than or equal to the rate distortion cost resulting from using the N×N transforms at step 612, process 600 branches to step 614, where a motion search is separately performed for both 2N×4N sub-blocks and 4N×2N sub-blocks. At next step 616, each motion vector resulting from the motion search is used to generate a prediction block by translating pixels from the reference frame using the motion vector. Then, a respective residual block is generated by subtracting a prediction block from a sub-block. A transform having a dimension of 2N×4N is applied to each resultant 2N×4N residual block, and a transform having a dimension of 4N×2N is applied to each resultant 4N×2N residual block. Finally, the transformed blocks are quantized and entropy coded. Thus, the block is encoded twice, once by encoding its 2N4×N sub-blocks, and once by encoding its 4N×2N sub-blocks. The encoded block with a minimal rate distortion cost for each of the 4N×2N and 2N×4N sub-block partitions is stored, along with the minimum rate distortion cost. This represents another rate distortion loop. After this step, process 600 advances to step 624 discussed below.

In contrast, if the rate distortion cost resulting from using the 2N×2N transforms is greater than the rate distortion cost resulting from using the N×N transforms at step 612, process 600 branches to step 618, where motion-compensated prediction is performed for N×N sub-blocks of the block. This step may involve performing a rate distortion loop that tests various N×N inter prediction modes for each sub-block, generates residual blocks for each mode and each sub-block, transforms the residual blocks using an N×N transform, quantizes the transformed residual blocks and entropy codes the quantizer coefficients.

The motion vector and reference frame that results in the smallest rate distortion cost for each N×N sub-block is compared to its neighboring blocks and, if appropriate, the N×N residuals are combined in step 620. In this example, neighboring blocks that have substantially the same motion information are aggregated to form a composite block. For example, if the reference frame is the same and the motion vector is the same within a defined range, such as a ±10% difference in vector values or within a standard deviation of each other, etc., neighboring blocks may be combined in a composite block. The combined residuals form a composite block that is encoded in step 622. Specifically, each composite block is transformed using a spatial transform having the same dimension as the composite block. Then, the transformed composite block is quantized and then entropy encoded to calculate the rate distortion associated with the N×N partition mode. Merging sub-blocks based on motion information can improve encoding efficiency while preserving low distortion values.

Figure 8:
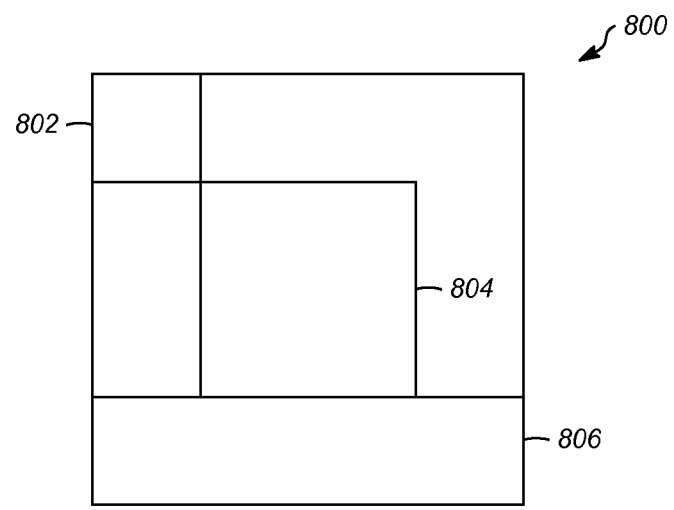
FIG. 8 is a diagram of a block and its sub-blocks according to an aspect of the teachings herein.

Sub-blocks can be combined to create 2N×N or N×2N sub-blocks, 4N×N or N×4N sub-blocks, 2N×2N sub-blocks, 4N×2N or 2N×4N sub-blocks or a 4N×4N sub-block, for example. Included in the possible sub-blocks of a block are the cases where no sub-blocks can be merged, and the block includes all N×N sub-blocks, and the case where all of the sub-blocks are merged together and the block includes one 4N×4N sub-block. FIG. 8 is a diagram of a block and its sub-blocks according to aspects of the teachings herein. FIG. 8 shows a 16×16 block 800 with a 4×4 sub-block 802, an 8×8 sub-block 804 and a 4×16 sub-block 806. The remaining sub-blocks of block 800 would also be of size 4×4 (that is, not combined with other sub-blocks), but are not shown for illustrative purposes.

Returning to FIG. 6, the rate distortion costs for encoding the block with encoding parameters including the various sub-blocks, inter prediction modes and transformation modes are compared at step 622 and the partition mode (i.e., sub-block size) that minimizes the rate distortion cost is identified as the final encoding parameter. For example, if the 4N×2N and 2N×4N partition modes are tested in steps 614 and 616, then the cost associated with each of these modes is compared to the cost of the 2N×2N partition mode stored in step 606. Desirably, and although not shown in FIG. 6, a 4N×4N partition mode is also tested, that is, a mode where the block is not subdivided for prediction, to generate a cost for this comparison once encoded. Thus, in step 624, one of the partition modes 4N×4N, 2N×2N, 4N×2N or 2N×4N is selected based on the mode resulting in the lowest cost. Then, in step 626, the encoded block included in the video bitstream is the block encoded in step 604, one of the blocks encoded in step 616 or the encoded 4N×4N block.

In contrast, if the N×N partition mode is tested in steps 618, 620 and 622, then the cost associated with the encoded composite block(s) in step 622 is compared to the cost of the 2N×2N partition mode stored in step 606. Similar to the description above, it is desirable that a 4N×4N partition mode is also tested to generate an encoded 4N×4N block and its associated cost. Thus, in step 624, one of the partition modes 4N×4N, 2N×2N or N×N is selected based on the mode resulting in the lowest cost. Then, in step 626, the encoded block included in the video bitstream is the block encoded in step 604, the block encoded in step 622 (e.g., the composite block(s) generated using the N×N sub-blocks) or the encoded 4N×4N block.

Bits that indicate the encoding parameters used to encode the block, such as the sub-block size (e.g., the prediction partition mode), motion vectors and, where applicable, the size and location of composite blocks are also included in the video bitstream, such as in a block header of the block. At step 628, process 600 checks to see if there are any blocks of the frame to be processed. Process 600 analyzes blocks, for example, in raster or other scan order. If all blocks are not done, process 600 loops back to step 602 to begin processing the next block. If all blocks are done, process 600 exits.

Figure 7:
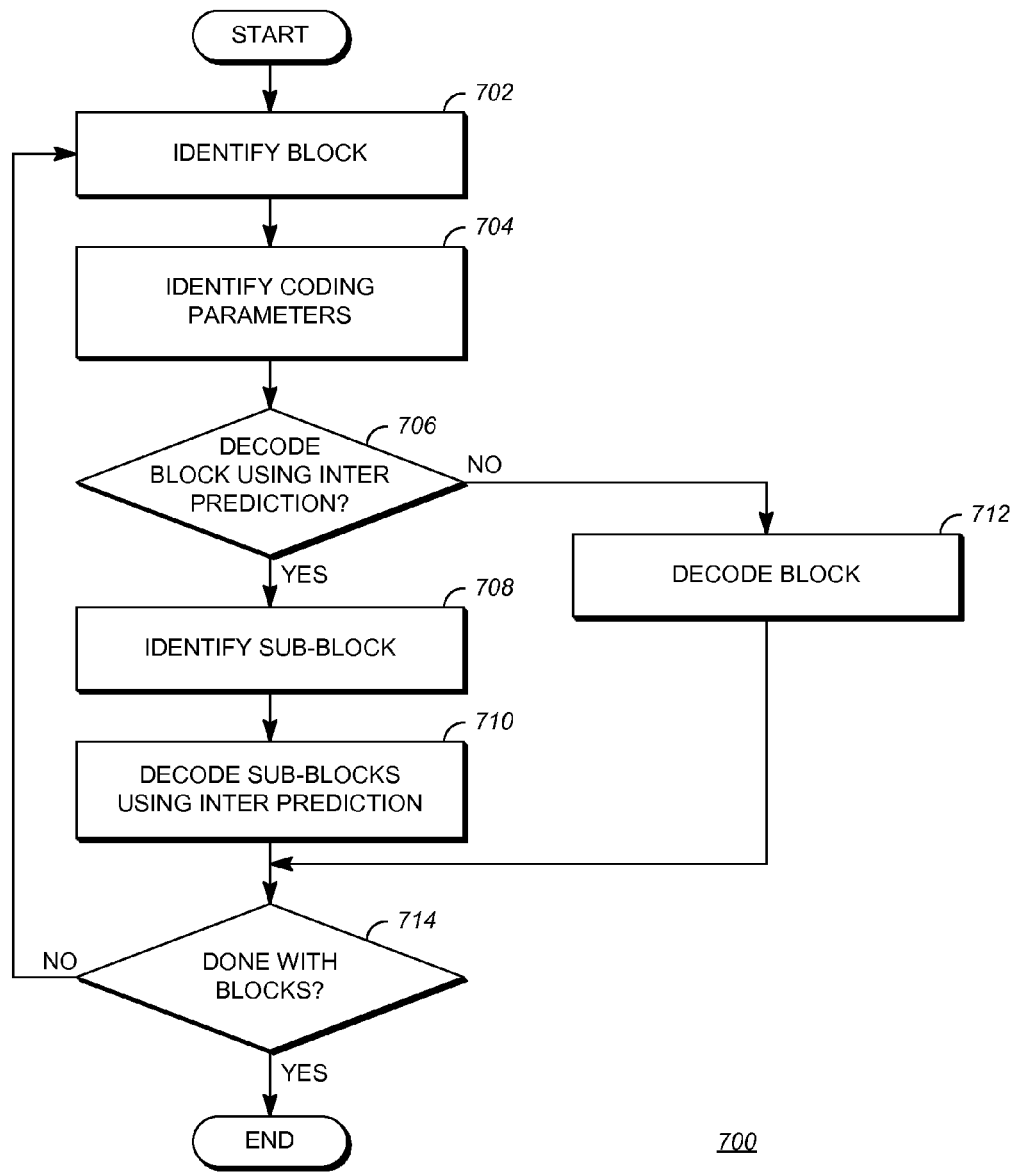
FIG. 7 is a flowchart diagram of a process for decoding a video stream according to an aspect of the teachings herein.

FIG. 7 is a flowchart diagram of a process 700 for decoding a video stream according to an aspect of the teachings herein. Process 700 can be implemented in a system such as system 500 to decode a video bitstream generated using motion vector dependent spatial transformation. Process 700 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 700. Process 700 can also be implemented using hardware in whole or in part. As explained above, some computing devices may have multiple memories and multiple processors, and the steps of process 700 may in such cases be distributed using different processors and memories.

For simplicity of explanation, process 700 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 702, process 700 begins decoding an encoded video bitstream by identifying a block included in a frame. At step 704, process 700 reads bits from a header associated with the block and/or bits from a header associated with the frame to identify the encoding parameters used to encode the block. These encoding parameters may include the encoding parameters described with respect to FIG. 6. At step 706, process 700 checks to see if the block has been encoded using inter prediction. If so, the block is to be decoded using inter prediction, and process 700 uses the encoding parameters to identify the sub-blocks of the block, if any, in step 708, and to decode the sub-blocks using the appropriate inter prediction and inverse transform modes in step 710. The inter prediction and inverse transform modes, including sizes, may be provided by the bits directly or may be discerned from other data in the bitstream. For example, the transform sizes may not be directly encoded and may be inferred from the sub-block size(s).

If inter prediction is not identified as the prediction to be used to decode the block at step 706, the block can be decoded by other decoding techniques at step 712, for example as discussed above in relation to FIG. 5. At step 714, process 700 checks to see if processing of blocks of the frame is done. If all blocks of the frame are decoded, process 700 loops back to step 702 to begin processing another block in the defined scan order. If all blocks are decoded, process 700 ends in response to the query of step 714.

According to the teachings herein, the necessity of testing a block split into small partitions for prediction may be reduced by performing prediction on larger partitions, and then comparing the rate distortion resulting from encoding the larger partitions using a transform of the same dimensions versus encoding the larger partitions using a transform having the dimensions of the smaller partitions. If the rate distortion resulting from encoding the larger partitions using the smaller transforms shows an improvement over encoding the larger partitions with larger transforms, motion searching may be performed on the block resulting from the smaller partitions. Before performing the transform of the residual sub-blocks, they may be combined with other sub-blocks having similar or the same motion information to form one or more composite blocks. The composite block(s) may be respectively transformed by transforms having the same dimensions to generate an encoded version of the entire block. If the rate distortion resulting from encoding the larger partitions using the smaller transforms does not show an improvement over encoding the larger partitions with larger transforms, motion searching may be performed on the block using partitions sizes between the larger partitions and the smaller partitions to provide alterative encoded versions of the block. The block is encoded according to the smallest rate distortion cost of the available versions of the encoded blocks.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized that contains other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for encoding a video stream having a plurality of frames, the apparatus comprising:
   a memory; and
   a processor configured to execute instructions stored in the memory to:
   encode a block a first time to generate a first rate distortion value by encoding at least one sub-block of the block having a first size using a respective inter prediction mode and a transform having the first size;

encode the block a second time to generate a second rate distortion value by encoding the at least one sub-block of the block having the first size using the respective inter prediction mode and a transform having a second size smaller than the first size;

if the second rate-distortion value is less than the first rate distortion value:

perform inter prediction of the block by performing inter prediction of a plurality of sub-blocks of the block having the second size to generate a respective plurality of sub-block residuals;

combine one or more of the plurality of sub-block residuals to form at least one composite block using motion information associated with respective ones of the plurality of sub-blocks; and encode the block a third time to generate a third rate distortion value by transforming sub-block residuals of each composite block of the at least one composite block using a respective transform corresponding to a size of each composite block; and select an output encoded block as an encoded block having a lowest rate distortion value.

2. The apparatus of claim 1, wherein the processor is configured to, if the first rate distortion value is greater than the second rate distortion value:

encode the block a fourth time to generate a fourth rate distortion value by encoding a plurality of sub-blocks of the block having a third size greater than the first size; and encode the block a fifth time to generate a fifth rate distortion value by encoding a plurality of sub-blocks of the block having a fourth size greater than the first size and different from the third size.

3. The apparatus of claim 2, wherein a size of the block is larger than the first size, the method further comprising:

encoding the block a sixth time to generate a sixth rate distortion value by encoding the block using an inter prediction mode and a transform having the size of the block.

4. The apparatus of claim 2, wherein the processor is configured to:

partition the block into two partitions to form the at least one sub-block of the block having the first size before encoding the block the first time.

5. The apparatus of claim 2, wherein the first size is 2N×2N, the second size is N×N, the third size is 4N×2N, and the fourth size is 2N×4N; and wherein N is an integer equal to or greater than 2.

6. The apparatus of claim 1, wherein the first size is 2N×2N, the second size is N×N, and a size of each composite block is one of N×N, 2N×N, N×2N, 2N×2N, N×4N, 4N×N, 2N×4N, 4N×2N, or 4N×4N; and wherein N is equal to 2.

7. The apparatus of claim 1, wherein the processor is configured to combine the one or more of the plurality of sub-block residuals to form the at least one composite block by:

comparing the motion information associated with respective ones of the plurality of sub-blocks; and grouping those of the plurality of sub-block residuals whose associated sub-blocks neighbour each other and have substantially the same motion information.

8. The apparatus of claim 7, wherein the motion information comprises a motion vector and a reference frame, and wherein sub-blocks have substantially the same motion information when each of the sub-blocks has a common reference frame and has a common motion vector within a defined range.

9. The apparatus of claim 7, wherein the motion information comprises a motion vector.

10. The apparatus of claim 7, wherein the motion information comprises a motion vector and a reference frame.

11. The apparatus of claim 1, wherein the processor is configured to, if the first rate distortion value is greater than the second rate distortion value:

encode the block at least a fourth time to generate a respective rate distortion value by encoding a plurality of sub-blocks of the block having at least a third size greater than the first size.

12. The apparatus of claim 1, wherein the first size is 2N×2N, the second size is N×N, and a size of each composite block is one of N×N, 2N×N, N×2N, 2N×2N, N×4N, 4N×N, 2N×4N, 4N×2N, or 4N×4N; and wherein N is an integer greater than 2.

13. The apparatus of claim 1, wherein the output encoded block is the block encoded the third time and the at least one composite block comprises a plurality of composite blocks having at least two different sizes, and wherein the processor is configured to:

include bits within the encoded video bitstream indicating the inter prediction modes used to encode the plurality of composite blocks and the at least two different sizes.

14. The apparatus of claim 1, wherein the processor is configured to:

include at least one bit within the encoded video bitstream indicating each inter prediction mode used to encode the output encoded block.

15. The apparatus of claim 1, wherein a size of the block is two times the first size, and the processor is configured to:

encode the block a fourth time to generate a fourth rate distortion value by encoding the block using an inter prediction mode and a transform having the size of the block.

16. The apparatus of claim 1, wherein the processor is configured to:

partition the block into two partitions to form the at least one sub-block of the block having the first size before encoding the block the first time.

* * * * *